F. M. KIRSCH.
TANK.
APPLICATION FILED OCT. 25, 1918.
1,329,414.
Patented Feb. 3, 1920.
2 SHEETS—SHEET 1.
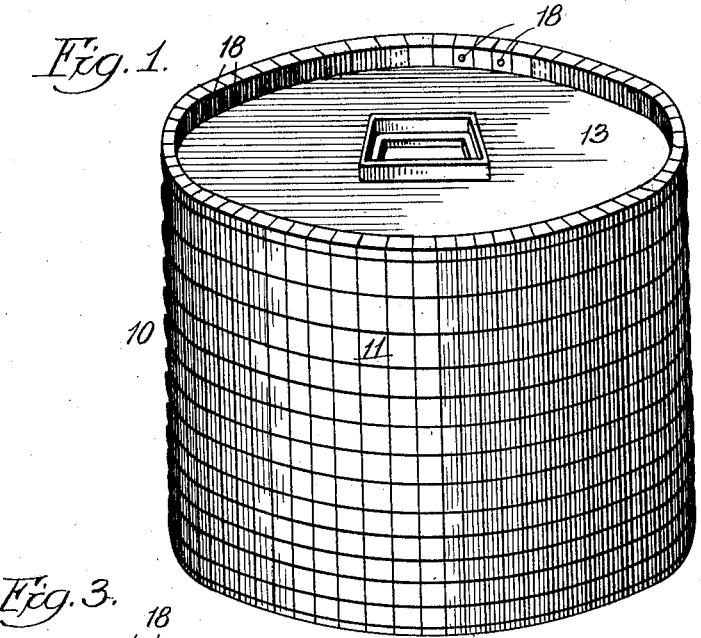
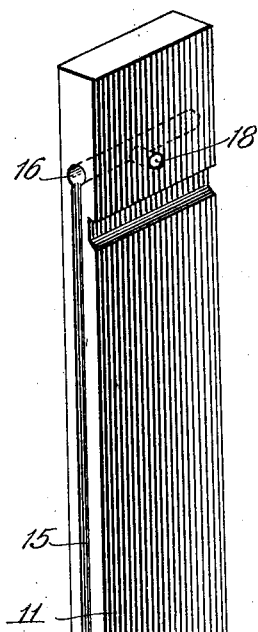
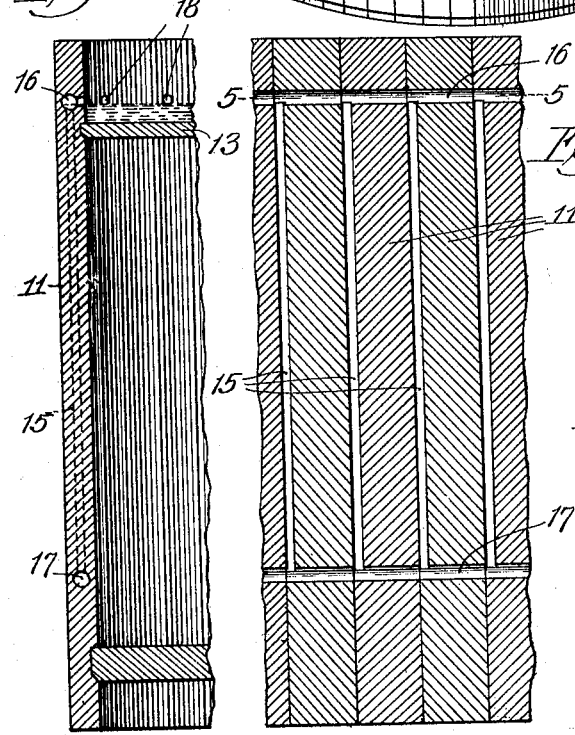
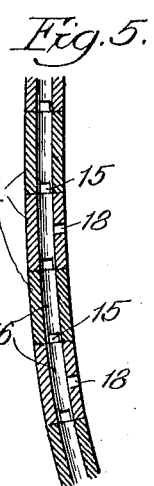
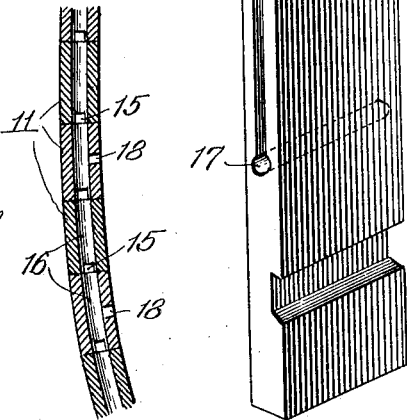
Witness:
John Enders
Inventor:
Frederick M. Kirsch
By Wallace R. Lane
Atty.

F. M. KIRSCH.
TANK.
APPLICATION FILED OCT. 25, 1918.
1,329,414.
Patented Feb. 3, 1920.
2 SHEETS—SHEET 2.
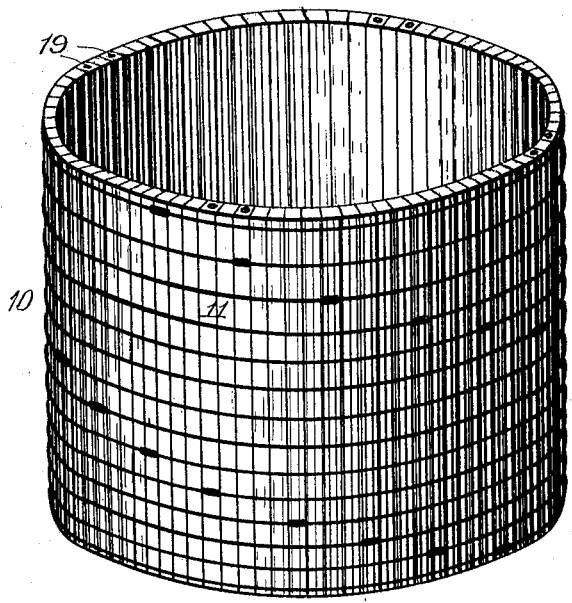
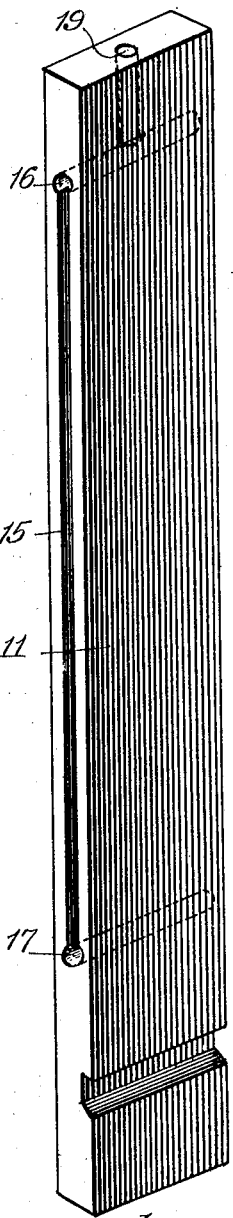
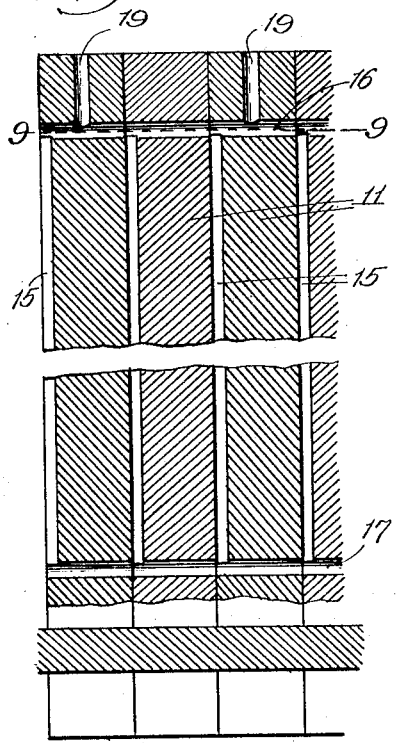
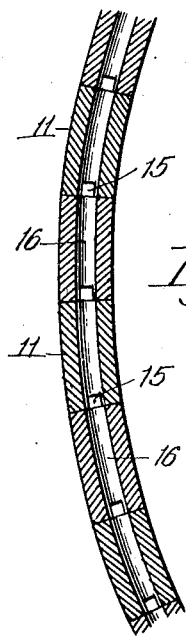
Witness:
John Enders
Inventor:
Frederick M. Kirsch
by Wallace R. Lane
Atty.

UNITED STATES PATENT OFFICE.

FREDERICK M. KIRSCH, OF PORTLAND, OREGON, ASSIGNOR TO NATIONAL TANK AND PIPE COMPANY, OF PORTLAND, OREGON, A CORPORATION OF OREGON.

TANK.

1,329,414.   Specification of Letters Patent.   Patented Feb. 3, 1920.

Application filed October 25, 1918. Serial No. 259,607.

*To all whom it may concern:*

Be it known that I, FREDERICK M. KIRSCH, a citizen of the United States, residing in the city of Portland, county of Multnomah, and State of Oregon, have invented certain new and useful Improvements in Tanks, of which the following is a specification.

This invention relates to tanks constructed of staves and designed primarily for holding water, oil, liquid or other material.

It is an object of the invention to provide such a tank with improved means for efficiently preventing the shrinkage of the tank which does not diminish the effectiveness of the construction of the tank as do the tanks of the prior art.

The above and other features of novelty, advantages and capabilities will become apparent from a detailed description of the accompanying drawings, in which I have illustrated a tank embodying my invention. The construction there shown, however, is to be understood as illustrative only and not as defining the limits of my invention.

Referring to the accompanying drawings:

Figure 1 is a perspective view of a tank embodying one form of my invention.

Fig. 2 is an enlarged detail view of one of the staves.

Fig. 3 is a vertical sectional view through the tank shown in Fig. 1, having a portion thereof broken away.

Fig. 4 is a vertical sectional view of a broken portion of the tank shown in Fig. 1.

Fig. 5 is a horizontal sectional view taken on the line 5—5 of Fig. 4.

Fig. 6 is a perspective view of a tank embodying my invention in a slightly different form.

Fig. 7 is an enlarged detail view of one of the staves of the tank shown in Fig. 6.

Fig. 8 is a vertical sectional view of a portion of the tank shown in Fig. 6.

Fig. 9 is a horizontal view taken on the line 9—9 of Fig. 8.

Referring to the drawings in detail, the tank which is indicated as a whole by the reference character 10 is composed of a plurality of staves 11. Each stave is provided with a croze for receiving the bottom, and where the tank is provided with the head 13, as shown in Fig. 1, the staves are also provided near their upper edge with a croze 14 for receiving the head 13. Each stave is provided on one vertical edge only with a groove 15, extending from a point near the top to a point near the bottom thereof, the opposite vertical edge of said stave being preferably formed with a flat surface. As the staves are assembled in the construction of a tank, the edge containing the vertical groove is placed against the flat surface of the adjacent stave. This arrangement provides a decided advantage over the old constructions, where both sides of each stave were grooved, and it was necessary to fit a grooved side to a grooved side, for with my construction, by having only one side grooved, which abuts against the flat surface of the adjacent stave, the necessity of having two grooves parallel with each other is obviated, and at the same time the strength or efficiency of the stave is considerably greater than if both edges were grooved. In a construction of this kind where both vertical edges of the staves are grooved, the grooves do not match unless the staves are properly trued up, while with my construction with a groove in but one edge, this objection is overcome.

Arranged near the top and bottom of each of the staves and extending entirely therethrough are horizontal bores 16 and 17, which open into the vertical grooves 15, so that when the staves are positioned in the tank, these horizontal grooves form a continuous horizontal passage around the tank near the top and bottom thereof, and communicate with the vertical grooves in each of the staves.

In order to feed water to the horizontal and vertical grooves of the staves, there are communicating passages in the staves leading to the upper horizontal bore. In the form shown in Figs. 1, 2, 3, 4 and 5, in which the tank is provided with a head, the staves are provided with the horizontal bore 18, extending from the inside thereof, positioned near the edge of the staves and slightly above the head and extending from the inside thereof to the upper horizontal passage 16, so that in this construction a sufficient amount of water is carried by the head as best shown in Fig. 3, so as to form a water jacket for the head of the tank, and at the same time feed the water into the horizontal continuous passage in the upper end of the stave, where it passes down through the vertical grooves, through the lower horizontal passage. In the form shown in Figs.

6, 7, 8 and 9, which is the tank without the head, some of the staves are provided with vertical bores 19 spaced apart around the tank, and extending downwardly from the upper end of the tank sufficiently to open into the upper horizontal passage 16, to admit water and allow the air to escape. In this form of a tank, the water is fed through the vertical openings down through the horizontal continuous passage from where it passes into the vertical grooves in the staves and the lower horizontal continuous passage.

It will be seen by providing the tank with a continuous passage extending entirely around the tank, both near the upper and lower edges, the danger of a section of the tank becoming dry on account of collection of sediment or stoppage of any particular inlet hole, is entirely eliminated, for my construction is such as to afford a supply of water around each stave, even though practically all of the inlet openings should become clogged.

Another big advantage of the construction shown in Figs. 1, 2, 3, 4 and 5, the head is flooded with water as shown in Fig. 3, the water percolates or passes into all of the horizontal openings 18, which assures a positive supply or feed of water through these openings to the vertical grooves and continuous passages in the staves.

While I have illustrated in the drawings a number of passages 18 for conveying the water from the supply on the head to the horizontal opening 16, also a number of vertical openings 19 in the modification shown in Fig. 6, it is to be understood that the number and position of these openings may vary, and all that is necessary is to provide a passage sufficiently to admit water and allow the air to escape.

Having now described my invention, I claim:

1. A tank composed of a plurality of staves, said staves being provided on one edge with a vertical groove intermediate of its ends and with a flat surface on the opposite vertical edge, said staves being arranged so that the grooved edge of one stave is in contact with the flat vertical edge of the adjacent stave whereby to form a channel in the edge of one stave, said channel having its open side covered by the adjacent stave.

2. A tank composed of a plurality of staves, said staves being provided on one edge with a vertical groove intermediate of its ends and with a flat surface on the opposite vertical edge, said staves being arranged so that the grooved edge of one stave is in contact with the flat vertical edge of the adjacent stave, and continuous horizontal passages arranged near the top and bottom of said staves communicating with said vertical grooves, substantially as and for the purposes set forth.

3. A tank composed of a plurality of staves, said staves being provided on one edge with a vertical groove intermediate of its ends and with a flat surface on the opposite vertical edge, said staves being arranged so that the grooved edge of one stave is in contact with the flat vertical edge of the adjacent stave, continuous horizontal passages arranged near the top and bottom of said staves communicating with said vertical grooves, and feed supply openings in said staves communicating with one of said horizontal passages, substantially as and for the purpose set forth.

4. A tank composed of a plurality of staves, each stave being provided with a vertical groove, a horizontal communicating passage in said staves, a head in said tank positioned below the upper end of said staves and adapted for supporting a supply of water thereon, and communicating passages in the upper ends of said staves for conveying the water on said head to the horizontal passages and the vertical grooves in said staves.

5. A tank composed of a plurality of staves, said staves being provided on one edge with a vertical groove intermediate of its ends and with a flat surface on the opposite vertical edge, said staves being arranged so that the grooved edge of one stave is in contact with the flat vertical edge of the adjacent stave, continuous horizontal passages arranged near the top and bottom of said staves communicating with said vertical grooves, a head in said tank positioned below the upper end of said staves for supporting a supply of water, a communicating passage positioned above said head and below the upper end of said staves to form a passage for the water on said head to the horizontal passage in the upper edges of said staves.

In witness whereof I hereunto subscribe my name to this specification in the presence of two witnesses.

FREDERICK M. KIRSCH.

Witnesses:
 HENRY NORTH,
 L. E. LONG.